(12) United States Patent
Ogunleye et al.

(10) Patent No.: US 8,561,392 B2
(45) Date of Patent: Oct. 22, 2013

(54) APPARATUS, SYSTEM, AND METHOD FOR REDUCTANT LINE HEATING CONTROL

(75) Inventors: Hakeem Ogunleye, Columbus, IN (US); Baohua Qi, Columbus, IN (US); Mickey McDaniel, Greenwood, IN (US)

(73) Assignee: Cummins IP, Inc., Minneapolis, MN (US)

( * ) Notice: Subject to any disclaimer, the term of this patent is extended or adjusted under 35 U.S.C. 154(b) by 422 days.

(21) Appl. No.: 12/817,880

(22) Filed: Jun. 17, 2010

(65) Prior Publication Data
US 2011/0083621 A1    Apr. 14, 2011

Related U.S. Application Data

(60) Provisional application No. 61/218,222, filed on Jun. 18, 2009.

(51) Int. Cl.
*F01N 3/00*    (2006.01)

(52) U.S. Cl.
USPC ............ 60/286; 60/295; 60/298; 60/301; 60/303

(58) Field of Classification Search
USPC ............ 60/274, 286, 295, 297, 298, 301, 303
See application file for complete search history.

(56) References Cited

U.S. PATENT DOCUMENTS

| | | | |
|---|---|---|---|
| 5,884,475 A | 3/1999 | Hofmann et al. | |
| 6,155,212 A * | 12/2000 | McAlister | 123/3 |
| 6,901,748 B2 | 6/2005 | Gomulka | |
| 7,398,771 B2 | 7/2008 | Theorell et al. | |
| 7,647,767 B2 * | 1/2010 | Osaku et al. | 60/286 |
| 7,765,793 B2 * | 8/2010 | Nishiyama et al. | 60/280 |
| 7,788,905 B2 * | 9/2010 | Ueda et al. | 60/286 |
| 7,805,930 B2 * | 10/2010 | Satou et al. | 60/286 |
| 7,849,674 B2 * | 12/2010 | Masuda et al. | 60/286 |
| 7,895,829 B2 * | 3/2011 | Suzuki et al. | 60/286 |
| 7,966,811 B2 * | 6/2011 | Reed | 60/286 |
| 8,015,801 B2 * | 9/2011 | Oberski et al. | 60/286 |
| 2003/0037542 A1 | 2/2003 | Xu et al. | |
| 2004/0098973 A1 | 5/2004 | Tennison et al. | |
| 2004/0098976 A1 | 5/2004 | Van Nieuwstadt et al. | |

(Continued)

FOREIGN PATENT DOCUMENTS

| | | |
|---|---|---|
| WO | 2007017080 | 2/2007 |
| WO | 2009003483 A2 | 1/2009 |

OTHER PUBLICATIONS

PCT/US2010/039048, International Search Report and Written Opinion, Feb. 1, 2011.

*Primary Examiner* — Binh Q Tran
(74) *Attorney, Agent, or Firm* — Kunzler Law Group, PC (57) ABSTRACT

In one embodiment, an apparatus is disclosed for heating a reductant delivery line using coolant from an internal combustion engine where the reductant delivery line receives reductant from a reductant tank and a portion of a coolant line is positioned within the reductant tank. The apparatus includes a coolant temperature module that is configured to determine a reductant tank outlet coolant temperature target. Additionally, the apparatus includes a coolant flow rate module that is configured to generate a coolant valve flow rate command and transmit the command to a coolant valve. The coolant valve is controllable to regulate the flow rate of coolant through the coolant line. The coolant valve flow rate command is based on the reductant tank outlet coolant temperature target, a reductant tank inlet coolant temperature, and a reductant tank reductant temperature.

22 Claims, 4 Drawing Sheets

(56) References Cited

U.S. PATENT DOCUMENTS

| | | |
|---|---|---|
| 2007/0110642 A1 | 5/2007 | Hirata |
| 2008/0092531 A1 | 4/2008 | Suzuki et al. |
| 2008/0202473 A1 | 8/2008 | Cook et al. |
| 2008/0276598 A1 | 11/2008 | Gresens |
| 2009/0028533 A1 | 1/2009 | Starck |
| 2010/0242439 A1* | 9/2010 | Domon et al. .............. 60/274 |
| 2011/0011064 A1* | 1/2011 | Kamiya et al. ............. 60/295 |

\* cited by examiner

APPARATUS, SYSTEM, AND METHOD FOR REDUCTANT LINE HEATING CONTROL

CROSS-REFERENCE TO RELATED APPLICATION

This application claims the benefit of U.S. Provisional Patent Application No. 61/218,222, filed Jun. 18, 2009, which is incorporated herein by reference.

FIELD

This invention relates to selective catalytic reduction (SCR) systems for internal combustion engines, and more particularly to controlling the temperature of a reductant used by SCR systems to reduce $NO_x$ emissions in exhaust gas.

BACKGROUND

Exhaust after-treatment systems receive and treat exhaust gas generated from an internal combustion engine. Typical exhaust after-treatment systems include various components configured to reduce the level of harmful exhaust emissions present in the exhaust gas. For example, some exhaust after-treatment systems for diesel powered internal combustion engines include various components, such as a diesel oxidation catalyst (DOC), particulate matter filter or diesel particulate filter (DPF), and an SCR catalyst. In some exhaust after-treatment systems, exhaust gas first passes through the diesel oxidation catalyst, then passes through the diesel particulate filter, and subsequently passes through the SCR catalyst.

Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst reduces the amount of nitrogen oxides ($NO_x$) present in the exhaust gas.

SCR catalyst systems utilize a reductant to reduce $NO_x$ in exhaust gas. Typical SCR systems include a reductant delivery system that includes a reductant source, pump, and delivery mechanism. The reductant source can be a container or tank storing a reductant, such as, for example, urea solution or ammonium formate solution. The pump supplies reductant from the source to the delivery mechanism via a reductant line. The delivery mechanism, which typically is a reductant injector, delivers the reductant into an exhaust gas stream upstream of an SCR catalyst. In automotive applications, the reductant typically is urea, which decomposes to produce ammonia. After reduction, the ammonia reacts with $NO_x$ in the presence of the SCR catalyst to reduce $NO_x$ to less harmful emissions, such as $N_2$ and $H_2O$.

For proper operation, the temperature of the reductant stored in the reductant storage tank and pumped through the reductant line between the tank and delivery mechanism must be maintained above the freezing point of the reductant solution. Emissions regulations require SCR systems to provide a temperature control system for heating the reductant when operating at low ambient temperatures.

Due to the high power needed for heating large amounts of reductant, conventional SCR systems typically have a reductant temperature control system that uses engine coolant to heat the reductant stored in the tank. In contrast, because the amount of reductant flowing through reductant lines is relatively small, less power is required to heat reductant lines. Accordingly, conventional systems may employ electrical heaters instead of coolant to heat reductant lines.

Electrical heaters, however, suffer from several limitations. For example, due to the difficulties in measuring the temperature of reductant inside a reductant line, electrical heaters require an ambient air temperature sensor as the primary input for proper operation. This is because the energy for electrical heaters is supplied by an adjustably controlled applied voltage or current. Because the temperature increase of the reductant is dependent upon the supplied electrical energy rather than absolute temperature, the ambient air temperature as detected by an ambient air sensor is required as a reference point from which a proper heating temperature, i.e., an upper heating limit, is established. Unfortunately, ambient air temperature sensors may be defective or become inaccurate over time based on limits and locations of ambient air temperature sensors, which may lead to an increased risk of overheating the reductant. In addition to an ambient air temperature sensor, electrical heaters require a separate controller, battery, and control relay, each of which may add to the energy, software, and hardware costs, as well as the bulk and complexity of the system.

Alternatively, in certain conventional systems, coolant from an engine is used to heat reductant in the reductant lines instead of an electrical heater. A dedicated coolant control valve is commonly used for facilitating the flow of coolant through the reductant line with one or more additional coolant control valves used to facilitate the flow of coolant through the reductant tank. The controls used in conventional coolant-based reductant heating systems do not control or modulate the coolant flow rate. Rather, the controls switch the control valves on to allow coolant flow or off to prevent coolant flow based on pre-determined timing schedules according to a sensed ambient temperature. Accordingly, like electrical heaters, conventional coolant heaters typically require an ambient temperature sensor for providing a reference point.

Further, due to the absence of a temperature sensor in the reductant line, another limitation of conventional systems is the inability to ensure the temperature of reductant in a reductant line is maintained above the freezing point of the reductant and below an upper threshold corresponding with the maximum temperature allowed in the reductant delivery system.

SUMMARY

The subject matter of the present application has been developed in response to the present state of the art, and in particular, in response to the problems and needs in the art that have not yet been fully solved by currently available exhaust after-treatment control systems and reductant heating systems. Accordingly, the subject matter of the present application has been developed to provide an apparatus, system, and method that overcomes at least some of the shortcomings of the prior art.

In one representative embodiment, an apparatus is described for heating a reductant delivery line using coolant from an internal combustion engine where the reductant delivery line receives reductant from a reductant tank that contains reductant and a portion of a coolant line is positioned within the reductant tank. The apparatus includes a coolant temperature module that is configured to determine a reductant tank outlet coolant temperature target. Additionally, the apparatus includes a coolant flow rate module that is configured to generate a coolant valve flow rate command and transmit the coolant valve flow rate command to a coolant valve. The coolant valve is controllable to regulate the flow rate of coolant through the coolant line. The coolant valve flow rate command is based on the reductant tank outlet coolant temperature target, a reductant tank inlet coolant temperature, and a reductant tank reductant temperature.

In some implementations, the coolant valve flow rate command comprises a pulse-width modulation signal. In yet some implementations, the coolant flow rate module generates the coolant valve flow rate command independent of an ambient temperature. Also, in certain implementations the coolant flow rate module generates the coolant flow rate command based on a feedforward model. According to more specific implementations, the coolant valve flow rate command is based on a rate of change of the reductant tank reductant temperature over time.

According to one implementation of the apparatus, the reductant tank outlet coolant temperature target is defined by a predetermined upper temperature threshold and a predetermined lower temperature threshold. In yet another implementation of the apparatus, the reductant tank outlet coolant temperature target comprises a coolant temperature value sufficient to thaw reductant in the reductant tank during operation of the internal combustion engine, prevent refreezing of the reductant in the reductant tank during operation of the internal combustion engine, and maintain a temperature of reductant in the reductant tank and reductant delivery line below a maximum tolerable temperature during operation of the internal combustion engine.

According to yet another implementation, the apparatus further includes a heat exchange power module that is configured to determine a heat exchange power factor. The heat exchange power module determines the heat exchange power factor according to a first mode when the reductant tank reductant temperature is above a freezing temperature of the reductant and according to a second mode when the reductant tank reductant temperature is below the freezing temperature of the reductant. The coolant valve flow rate command is based on the determined heat exchange power factor. In the first mode, the heat exchange power factor can be determined by multiplying together a level of reductant in the reductant tank, a rate of change of the reductant tank reductant temperature, and a specific heat of the reductant in the reductant tank. In the second mode, the heat exchange power factor can be a predetermined constant.

The apparatus can further include a coolant temperature difference module in some implementations. The coolant temperature difference module can be configured to determine a difference between the reductant tank outlet coolant temperature target and the reductant tank inlet coolant temperature. The coolant valve flow rate command can be based on the difference between the reductant tank outlet coolant temperature target and the reductant tank inlet coolant temperature. Additionally, the apparatus can include a comparison module is some implementations that is configured to compare the heat exchange power factor and the difference between the reductant tank outlet coolant temperature target and the reductant tank inlet coolant temperature against a predetermined look-up table to determine a coolant valve modulation signal value. In such implementations, the coolant valve flow rate command corresponds with the determined coolant valve modulation signal value.

In another embodiment, a reductant heating system includes a coolant line that includes a first portion positionable in heat exchanging communication with reductant in a reductant tank and a second portion positionable in heat exchanging communication with reductant in a reductant line. The reductant line is configured to receive reductant from the reductant tank. The system includes a flow regulation device coupled to the coolant line. The device is configured to regulate the flow rate of coolant entering the first portion of the coolant line. The system further includes a controller that is communicable in signal transmitting communication with the flow regulation device to vary the flow rate of coolant through the first portion of the coolant line to achieve a desired temperature of coolant in the second portion of the coolant line.

According to some implementations, the reductant heating system further includes a temperature sensor coupled to the coolant line. The temperature sensor is configured to sense the temperature of coolant entering the first portion of the coolant line. Moreover, the controller is configured to vary the flow rate of coolant entering the first portion of the coolant line based on a temperature of the coolant sensed by the temperature sensor.

In another implementation of the system, the controller is further configured to vary the flow rate of coolant entering the first portion of the coolant line based on at least one of a temperature of reductant in the reductant tank, a rate of change of the temperature of reductant in the reductant tank, a specific heat of the reductant in the reductant tank, a level of reductant in the reductant tank, a difference between the temperature of the coolant sensed by the temperature sensor and the desired temperature of coolant in the second portion of the coolant line, and a shape of the reductant tank and a specific heat of the coolant. In some implementations, the second portion of the coolant line winds about the reductant line.

According to yet another embodiment, a method for heating reductant in a reductant line coupled to a reductant tank includes sensing a temperature of coolant entering a coolant line. The coolant line is positioned in heat transfer communication with reductant in the reductant line and reductant tank. The method also includes determining upper and lower temperature thresholds of reductant in the reductant line. Further, the method includes regulating a single flow regulating valve to adjust a flow rate of coolant through the coolant line based on the sensed temperature of coolant entering the coolant line to maintain the temperature of reductant in the reductant line below the upper temperature threshold and above the lower temperature threshold. In some implementations, regulating the single flow regulating valve can include adjusting the flow rate of coolant through the coolant line to maintain a temperature of reductant in the reductant tank above a threshold. In yet certain implementations, regulating the single flow regulating valve is based on a temperature of reductant in the reductant tank.

Reference throughout this specification to features, advantages, or similar language does not imply that all of the features and advantages that may be realized with the present disclosure should be or are in any single embodiment or implementation. Rather, language referring to the features and advantages is understood to mean that a specific feature, advantage, or characteristic described in connection with an embodiment is included in at least one embodiment of the present disclosure. Discussion of the features and advantages, and similar language, throughout this specification may, but do not necessarily, refer to the same embodiment or implementation.

The described features, advantages, and characteristics of the present disclosure may be combined in any suitable manner in one or more embodiments and/or implementations. One skilled in the relevant art will recognize that the subject matter of the disclosure may be practiced without one or more of the specific features or advantages of a particular embodiment or implementation. In other instances, additional features and advantages may be recognized in certain embodiments and/or implementations that may not be present in all embodiments or implementations of the disclosure. These features and advantages of the present disclosure will become more fully apparent from the following description and appended claims, or may be learned by the practice of the subject matter of the disclosure as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the following description, numerous specific details are provided to impart a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

Described herein are various embodiments of an apparatus, system, and method for heating a reductant in a reductant delivery system that overcomes one or more of the limitations of conventional techniques. According to at least some embodiments, the apparatus, system, and method heats reductant lines using an engine coolant. The temperature of the reductant in the reductant lines can be controlled by adjusting the duty cycles of a single coolant flow regulation valve via pulse-width modulation (PWM). The PWM commands controlling the valve are not dependent on ambient air temperature and thus the system does not require an ambient air temperature sensor. Additionally, the apparatus and system are configured such that modulation of the single coolant flow regulation valve can maintain the temperature of reductant in a reductant tank above a freezing temperature of the reductant and the temperature of reductant in the reductant lines below an upper threshold temperature corresponding to the maximum temperature allowed in the reductant delivery system.

In certain embodiments, the apparatus and system utilize a feedforward approach to generating and issuing PWM commands to the coolant flow regulation valve, which reduces software, hardware, and energy costs, and system complexity, compared to systems using a feedback approach. Additionally, because the reductant heating system described in certain embodiments herein is based on components and hardware already in use by other systems of the engine system (e.g., engine coolant lines, engine coolant temperature sensors, reductant level sensors, and reductant temperature sensors), the heating system reduces energy and hardware costs compared to conventional reductant heating systems.

Figure 1:
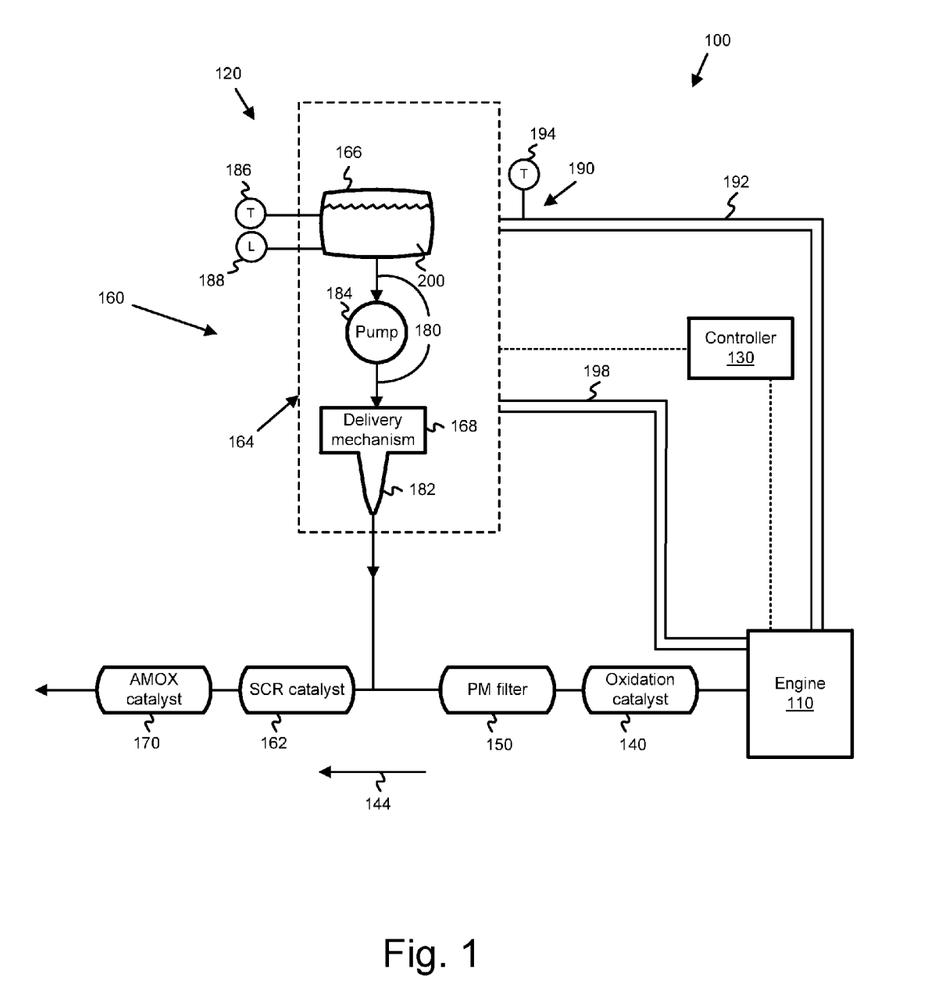
FIG. 1 is a schematic block diagram of an internal combustion engine system having an engine, an exhaust after-treatment system, a controller, and a reductant heating system according to one representative embodiment.

FIG. 1 depicts one embodiment of an internal combustion engine system 100. The main components of the engine system 100 include an internal combustion engine 110, an exhaust gas after-treatment system 120 coupled to the engine, and a controller 130 in electronic communication with the engine 110 and after-treatment system 120.

The internal combustion engine 110 can be a compression ignited internal combustion engine, such as a diesel fueled engine, or a spark-ignited internal combustion engine, such as a gasoline fueled engine operated lean. Within the internal combustion engine 110, air from the atmosphere is combined with fuel to power the engine. Combustion of the fuel and air produces exhaust gas that is operatively vented to an exhaust manifold. From the exhaust manifold, at least a portion of the generated exhaust gas flows into the exhaust gas after-treatment system 120 in a direction indicated by directional arrow 144.

Generally, the exhaust gas after-treatment system 120 is configured to remove various chemical compounds and particulate emissions present in the exhaust gas generated by the engine 110. As exemplary of one particular embodiment, the exhaust gas after-treatment system 120 includes an oxidation catalyst 140, a particulate matter (PM) filter 150, an SCR system 160, and an ammonia oxidation (AMOX) catalyst 170. In the exhaust flow direction, indicated by directional arrow 144, exhaust may flow from the engine 110, through the oxidation catalyst 140, through the particulate filter 150, through an SCR catalyst 162 of the SCR system 160, through the AMOX catalyst 170, and then be expelled into the atmosphere via a tailpipe. In other words, the particulate filter 150 is positioned downstream of the oxidation catalyst 140, the SCR catalyst 162 is positioned downstream of the particulate filter 150, and the AMOX catalyst 170 is positioned downstream of the SCR catalyst 162.

Generally, exhaust gas treated in the exhaust gas after-treatment system 120 and released into the atmosphere consequently contains significantly fewer pollutants, such as diesel particulate matter, $NO_x$, hydrocarbons, and carbon monoxide, than untreated exhaust gas. Although the exhaust after-treatment system 120 shown includes one of an oxidation catalyst 140, particulate filter 150, SCR catalyst 162, and AMOX catalyst 170 positioned in specific locations relative to each other along the exhaust flow path, in other embodiments, the exhaust after-treatment system may include more than one of any of the various catalysts positioned in any of various positions relative to each other along the exhaust flow path as desired. Further, although the oxidation catalyst 140 and AMOX catalyst 170 are non-selective catalysts, in some embodiments, the oxidation and AMOX catalysts can be selective catalysts.

The SCR system 160 includes a reductant delivery system 164 that includes a reductant tank 166 storing reductant 200, a reductant pump 184, and a reductant delivery mechanism 168. The reductant tank 166 is capable of retaining the reductant 200, which can be, for example, urea solution or ammonium formate solution. The reductant tank 166 is in reductant supplying communication with the pump 184, which is configured to pump reductant from the reductant tank 166 to the delivery mechanism 168 via a reductant line 180. Alternatively, the pump 184 can be a push-type pump upstream of the reductant tank 166. The reductant line 180 can be any of various reductant lines commonly used in the art. In some implementations, the reductant line 180 is an elongate length of hydraulic tubing having any of various diameters, e.g., between about 6 mm and about 8 mm.

The delivery mechanism 168 can include a reductant injector 182 configured to inject reductant into the exhaust gas stream upstream of the SCR catalyst 162. The injector 182 is selectively controllable to inject reductant directly into the exhaust gas stream prior to the exhaust gas entering the SCR catalyst 162. In some embodiments, the reductant can be urea, which decomposes to produce ammonia. As will be described in more detail below, in these embodiments, the ammonia reacts with $NO_x$ in the presence of the SCR catalyst 162 to reduce the $NO_x$ to less harmful emissions, such as $N_2$ and $H_2O$. The SCR catalyst 162 can be any of various catalysts known in the art. For example, in some implementations, the SCR catalyst 162 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 162 is a zeolite-based catalyst.

In an automotive application where the engine 110 and exhaust gas after-treatment system 120 form part of a vehicle, the engine and exhaust gas after-treatment system can be exposed to harsh environmental conditions. Notwithstanding the potentially negative effects external conditions may have on the performance of an exhaust after-treatment system 120, the exhaust gas after-treatment system is expected to reduce harmful exhaust emissions in compliance with regulatory standards regardless of the external conditions. In extreme cold conditions, the reductant is prone to freezing, which would prevent reductant from being injected into the exhaust gas stream and $NO_x$ reduction on the SCR catalyst 162. Accordingly, the reductant contained in the source 166 must be heated to prevent freezing, which for a 32.5% wt urea solution (e.g., AdBlue urea solution manufactured by WEMA of Laksevaag, Norway) is about −11° C. Additionally, the reductant flowing within the reductant line 180 from the source 166 to the delivery mechanism 168 also must be heated to prevent freezing. However, the reductant should not be heated too much, as high temperatures may result in a breakdown of the chemical properties of the reductant and/or damage to the components of the reductant delivery system 164, e.g., the reductant line 180.

To unfreeze or prevent freezing of the reductant in the reductant delivery system 164, the internal combustion engine system 100 includes a reductant heating system 190. The reductant heating system 190 includes a coolant supply line 192 extending from the engine 110 to the reductant delivery system 164. Additionally, the reductant heating system 190 includes reductant temperature sensor 186, reductant level sensor 188, and coolant temperature sensor 194. In some implementations, the reductant temperature sensor 186 and reductant level sensor 188 are integrated together (e.g., AdBlue sensors manufactured by WEMA of Laksevaag, Norway). The reductant temperature sensor 186 is configured to sense the temperature of the reductant stored in the reductant tank 166, the coolant temperature sensor 194 is configured to sense the temperature of the coolant flowing through the coolant supply line 192, and the reductant level sensor 188 is configured to sense the level of the reductant in the reductant tank 166.

The coolant supply line 192 receives heated coolant from the engine 110. Conventionally, unheated coolant passes through the engine 110 during operation of the engine. As the coolant passes through the engine 110, heat generated by the engine is transferred to the coolant, thus heating the coolant. In this manner, the coolant is used to dissipate heat from, i.e., reduce the temperature of, the engine. In certain embodiments, the temperature of the coolant remains within a predetermined range during operation of the engine 110. In one specific implementation, the temperature of the coolant remains between about 50° C. and about 90° C. during operation of the engine 110. The maximum temperature of the coolant in a given engine system can be predetermined using common testing techniques known in the art.

Figure 2:
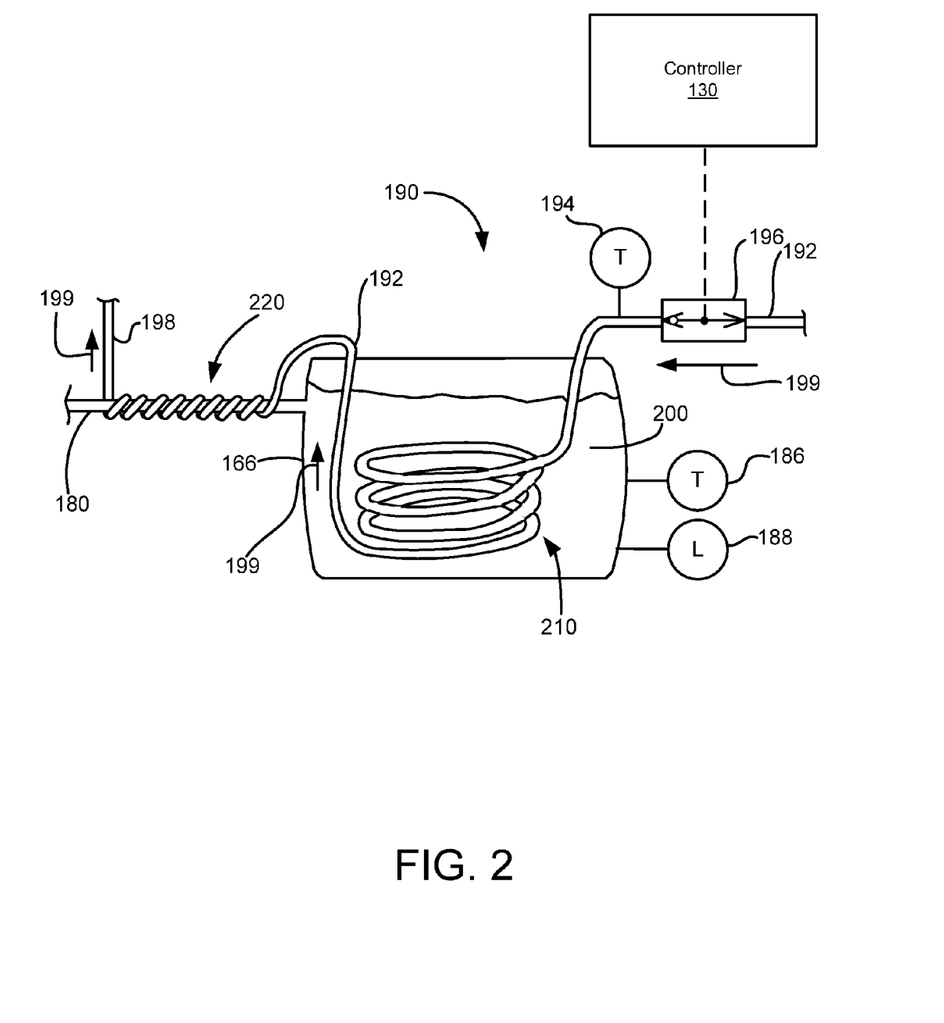
FIG. 2 is a partially schematic block diagram of a reductant heating system according to one representative embodiment.

Referring to FIG. 2, the coolant supply line 192 extends from the engine 110 and is positioned in heat supplying communication with reductant stored in the reductant tank 166. Coolant flows through the coolant supply line and coolant return line 198 as indicated by directional arrows 199. The coolant supply line 192 can be arranged in any of various arrangements or configurations within the reductant tank 166. To increase the surface area of the coolant supply line 192 in contact with reductant, thus enhancing heat transfer, in the illustrated embodiment, the coolant supply line is be wound in a coil configuration 210 within the reductant tank 166.

From the reductant tank 166, the coolant supply line 192 is positioned in heat supplying communication with the reductant line 180. The coolant supply line 192 can be arranged in any of various arrangements or configurations relative to the reductant line. In the illustrated embodiment, the coolant supply line 192 is continuously wound in a coil configuration 220 about the reductant line 180 along a length of the reductant line. In other embodiments, the coolant supply line 192 envelopes the reductant line 180 along a length of the reductant line to form a concentric tube heat exchanger. In some implementations, the length of the reductant line 180 in heat transfer communication with the coolant supply line 192 is substantially the entire length of the reductant line 180 between the reductant tank 166 and the delivery mechanism 168. In other implementations, the heat transfer length is any of various desirable lengths less than the entire length of the reductant line 180.

After transferring heat to the reductant line 180, the coolant supply line 192 transitions into a coolant return line 198 that returns the coolant back to the engine 110 for continued use. Because of the heat transfer loses to the reductant in the reductant source 166 and line 180, the coolant in the coolant return line 198 has a lower temperature than coolant in the coolant supply line 192.

The reductant heating system 190 includes a single flow regulating valve 196 configured to regulate the flow of coolant from the engine 110 into the reductant source 166. The flow regulating valve 196 is in signal receiving communication with the controller 130. The controller 130 transmits command signals to the flow regulating valve 196 corresponding to a desired coolant flow rate through the valve. In certain embodiments, the controller 130 controls the duty cycles of the flow regulating valve 196 according to a PWM technique. In this manner, the controller 130 can adjust the flow rate of the coolant through the valve 196 to any of an infinite number of flow rates.

Generally, the controller 130 controls the operation of the engine system 100 and associated sub-systems, such as the engine 110 and exhaust gas after-treatment system 120. The controller 130 is depicted in FIG. 2 as a single physical unit, but can include two or more physically separated units or components in some embodiments if desired. Generally, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 100 to control the system to achieve desired results, and more specifically, achieve desired exhaust gas emissions.

Figure 3:
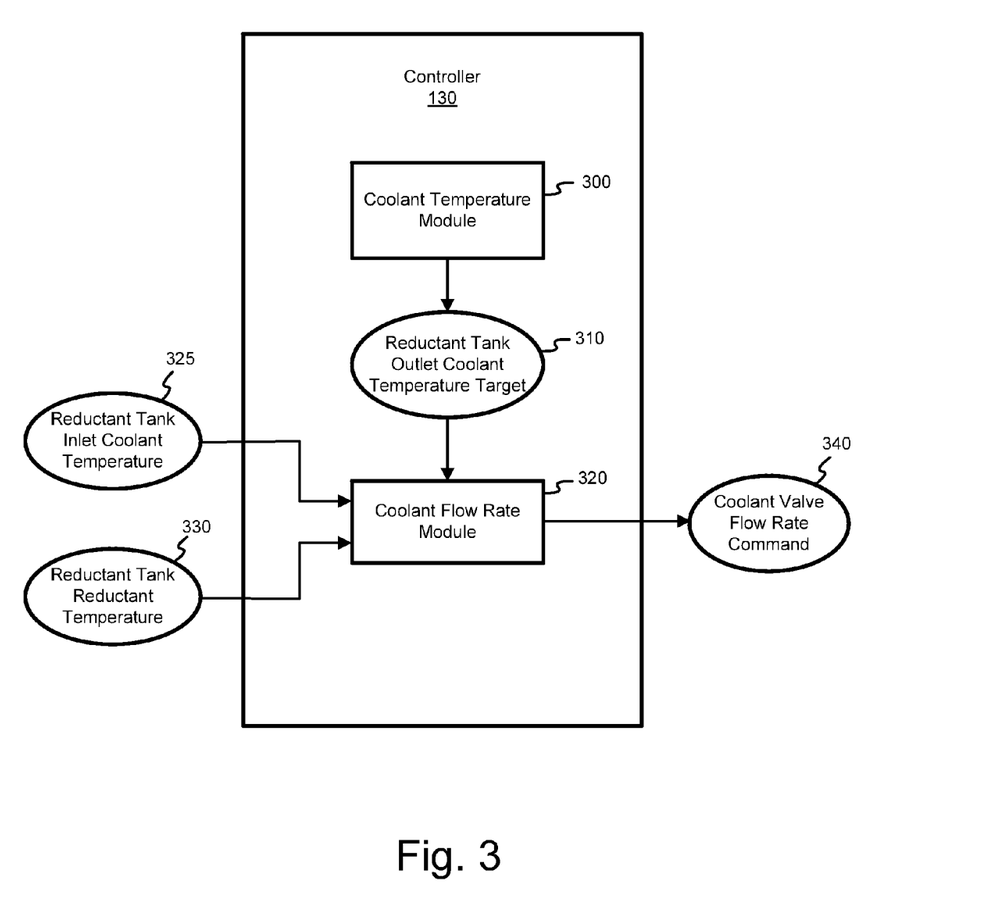
FIG. 3 is a schematic block diagram of a controller of an internal combustion engine system according to one representative embodiment.

Referring to FIG. 3, the controller 130 includes a coolant temperature module 300 and a coolant flow rate module 320. The coolant temperature module 300 is configured to determine a reductant tank outlet coolant temperature target 310. The target 310 represents the desired temperature of the coolant leaving the reductant tank 166, which is dependent on a desired temperature of the reductant in the reductant line 180. For example, the highest temperature of reductant in the reductant line 180 (e.g., the maximum tolerable reductant temperature, which in some embodiments is about 60° C.) is determined by the highest coolant temperature, which is typically around 90° C. Accordingly, the highest coolant temperature, which is a known value, can be utilized as a reference point for reductant line temperature control instead of ambient temperature. Relying on the highest coolant temperature as a reference, the reductant heating system 190 can be controlled to keep the temperature of the reductant within the reductant line 180 below the maximum tolerable reductant temperature and above the reductant freezing temperature. This is accomplished by modulating the flow rate of coolant through the reductant tank 166 using PWM duty cycles based at least partially on the engine coolant temperature, the temperature of reductant in the tank 166, and the rate of reductant temperature change within the tank.

In certain implementations, the coolant temperature module 300 sets the reductant tank outlet coolant temperature target 310 to a value sufficient to (i) thaw reductant in the reductant tank within a predetermined time limit; (ii) prevent refreezing of the reductant in the reductant tank during operation of the engine system 100 at the lowest ambient temperature; and (iii) maintain the reductant tank and line temperature below the maximum tolerable temperature during operation of the engine system at the highest ambient temperature. Generally, the coolant flow is controlled to bring enough heat to prevent reductant in the reductant line 180 from freezing, but not enough heat raise the temperature of reductant in the reductant line above the maximum tolerable temperature. Assuming the temperature of reductant in the tank 166 is lower than the temperature of the coolant exiting the tank, based on heat transfer principles, the reductant in the reductant line 180 is never higher than the temperature of the coolant. Accordingly, the reductant tank outlet coolant temperature target 310 preferably is equal to or less than the maximum tolerable temperature, but greater than the freezing temperature of the reductant.

As mentioned above, by configuring the system 190 to achieve a temperature of the reductant in the reductant line to be greater than freezing, the temperature of the reductant in the reductant tank is necessarily greater than freezing. Therefore, the system 190 can be configured to achieve the dual goals of maintaining the temperature of the reductant in the reductant line below a maximum tolerable temperature and above freezing and maintaining the temperature of reductant in the reductant tank above freezing using coolant from an engine and a single coolant flow regulation valve.

Based at least partially on the reductant tank outlet coolant temperature target 310, the coolant flow rate module 320 is configured to generate a coolant valve flow rate command 340, which is transmitted by the controller, such as via an interface module of the controller (not shown), to the flow regulation valve 196. As shown below in Equation 1, the coolant valve flow rate command 340 is represented by the product of the PWM duty cycle and the maximum coolant flow rate through the valve when the valve is fully opened. The flow regulation valve 196 then actuates a valve to allow a coolant flow rate through the valve corresponding with the command. The coolant flow rate module 320 generates the coolant valve flow rate command 340 based at least partially on a reductant tank inlet coolant temperature 325 and reductant tank reductant temperature 330 detected by the temperature sensors 194, 186, respectively.

When the reductant tank reductant temperature 330 is above a freezing temperature, e.g., −11° C., the coolant flow rate module 320 is configured to generate the coolant valve flow rate command (CVFRC) 340 according to the following equation:

$$CVFRC = PWM \times \dot{m}_{c,max} = \frac{L_r \times c_r \times \dot{T}_r}{(T_{c,in} - T_{c,out\_target}) \times k} \quad (1)$$

where PWM is the PWM duty cycle, $\dot{m}_{c,max}$ is the maximum coolant flow rate through the valve 196, $L_r$ is the level of reductant in the reductant tank 166 (e.g., mass of urea in the tank), $c_r$ is the specific heat of the reductant, $\dot{T}_r$ is the rate of temperature change of the reductant in the tank 166, $T_{c,in}$ is the reductant tank inlet coolant temperature 325, $T_{c,out\_target}$ is the reductant tank outlet coolant temperature target 310, and k is a predetermined factor based on the shape of the reductant source 166 and the specific heat of the coolant.

For a regular reductant tank, the parameter k can be calculated using the following equation:

$$k = \frac{c_c}{D_r \times A_r} \quad (2)$$

where $c_c$ is the specific heat of the coolant, $D_r$ is the reductant density, and $A_r$ is the effective cross-sectional area of the reductant tank. If the reductant tank shape is not regular, then the cross-sectional area $A_r$ is a function of the reductant level $L_r$ as follows:

$$A_r = \frac{V_r}{L_r} \quad (3)$$

where $V_r$ is the reductant volume at level $L_r$. In some implementations, the maximum coolant flow rate $\dot{m}_{c,max}$, the specific heat of the reductant $c_r$, and the factor k can be determined from a look-up table based on predetermined values accessible by the coolant flow rate module 320. The look-up table can be stored in a memory of the controller 130.

Figure 4:
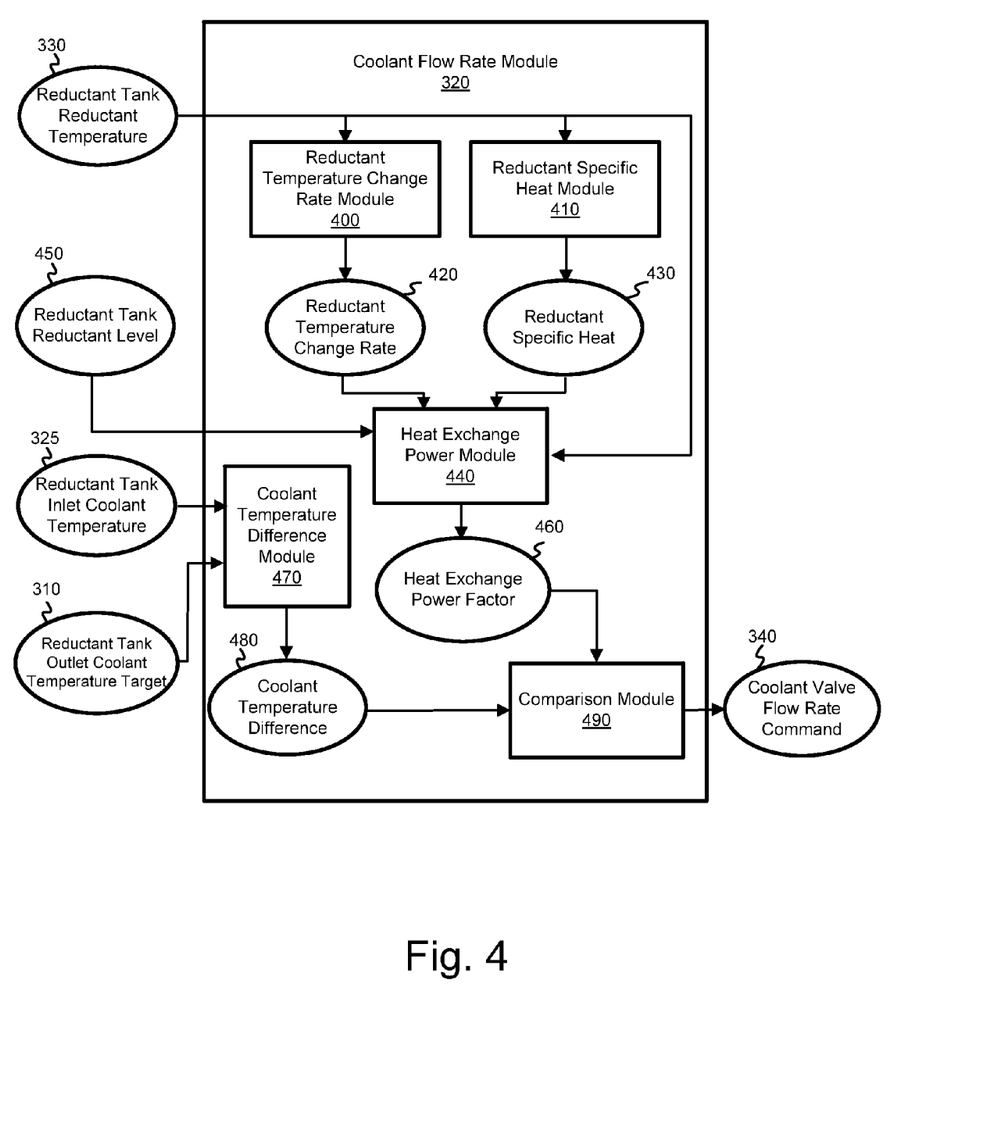
FIG. 4 is a schematic block diagram of a coolant flow rate module of the controller of FIG. 3 according to one representative embodiment.

According to one embodiment, the coolant flow rate module 320 implements Equation 1 according to the control structure shown in FIG. 4. The coolant flow rate module 320 includes a reductant temperature change rate module 400 and reductant specific heat module 410. The reductant temperature change rate module 400 determines a reductant temperature change rate 420 based on a history of stored reductant tank reductant temperature values 330 detected by the temperature sensor 186. More specifically, the reductant temperature change rate module 400 compares reductant tank reductant temperature values 330 taken over a period of time to estimate the rate at which the reductant temperature is presently changing in the tank. The reductant specific heat module 410 determines the specific heat 430 of the reductant by comparing the reductant tank reductant temperature 330 to a look-up table containing predetermined specific heat values and corresponding reductant temperatures.

The coolant flow rate module 320 also includes a heat exchange power module 440 configured to determine a heat exchange power factor 460 representative of the present ability of the reductant heating system 190 to transfer heat to the reductant. Because the heat transfer mechanism associated with liquid reductant is different than frozen or solid reductant, the heat exchange power factor 460 is determined differently depending on the phase of the reductant. Accordingly, the heat exchange power module 440 is configured to determine the phase of the reductant in the reductant source 166 based on the reductant tank reductant temperature 330.

If the temperature 330 is above a predetermined freezing temperature of the reductant, then the heat exchange power module 440 determines the heat exchange power factor 460 according to a first mode. If, however, the temperature 330 is below a predetermined freezing temperature of the reductant, then the heat exchange power module 440 determines the heat exchange power factor 460 according to a second mode. The first mode includes multiplying together the reductant tank reductant level 450, reductant temperature change rate 420, and the reductant specific heat 430 to obtain the heat exchange power factor 460. The second mode includes setting the heat exchange power factor 460 to the value of a predetermined constant associated with frozen or solid reductant.

Referring again to FIG. 4, the coolant flow rate module 320 includes a coolant temperature difference module 470 configured to determine a coolant temperature difference 480. Because the coolant loses heat as it flows through the reductant source 166, the temperature of the coolant entering the reductant source 166 is higher than the temperature of the coolant leaving the reductant source. The coolant temperature difference 480 is defined as the difference between the reductant tank inlet coolant temperature 325 as sensed by the temperature sensor 194 and the reductant tank outlet coolant temperature target 310 as determined by the coolant temperature module 300. Accordingly, the coolant temperature difference module 470 receives the reductant tank inlet coolant temperature 325 and reductant tank outlet coolant temperature target 310 and applies them to a comparison algorithm to determine the coolant temperature difference 480.

The coolant flow rate module 320 also includes a comparison module 490 configured to generate the coolant valve flow rate command 340. The comparison module 490 compares the heat exchange power factor 460 and the coolant temperature difference 480 against a look-up table containing predetermined PWM signal values. The PWM signal values are each associated with a specific heat exchange power factor 460 and coolant temperature difference 480 combination supplied by the look-up table. The PWM signal values in the look-up table are pre-calibrated to account for the shape of the reductant tank 166 and coolant specific heat (e.g., constant k discussed above) that may be specific to the particular engine system platform and coolant type. After obtaining the PWM signal value associated with the heat exchange power factor 460 and coolant temperature difference 480, the comparison module 490 generates the coolant valve flow rate command 340, which is representative of the obtained PWM signal. As discussed above, the coolant valve flow rate command 340 is then sent to the coolant flow rate regulation valve 196 and the valve actuates according to the command such that an actual tank outlet coolant temperature corresponding to the coolant temperature target 310 is achieved.

Although the above embodiments have been described in the context of an internal combustion engine system and reductant heating, the invention is not limited to such configurations. For example, in other embodiments, the apparatus, systems, and methods described herein can be applied to any of various systems where heating of a material may be desired without departing from the essence of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for heating a reductant delivery line using coolant from an internal combustion engine, the reductant delivery line receiving reductant from a reductant tank containing reductant and a portion of a coolant line being positioned within the reductant tank, comprising:
a coolant temperature module configured to determine a reductant tank outlet coolant temperature target; and
a coolant flow rate module configured to generate a coolant valve flow rate command and transmit the coolant valve flow rate command to a coolant valve controllable to regulate a flow rate of coolant through the coolant line, the coolant valve flow rate command being based on the reductant tank outlet coolant temperature target, a reductant tank inlet coolant temperature, and a reductant tank reductant temperature.

2. The apparatus of claim 1, wherein the coolant valve flow rate command comprises a pulse-width modulation signal.

3. The apparatus of claim 1, wherein the coolant flow rate module generates the coolant valve flow rate command independent of an ambient temperature.

4. The apparatus of claim 1, wherein the coolant flow rate module generates the coolant flow rate command based on a feedforward model.

5. The apparatus of claim 1, wherein the coolant valve flow rate command is further based on a rate of change of the reductant tank reductant temperature over time.

6. The apparatus of claim 1, wherein the reductant tank outlet coolant temperature target is defined by a predetermined upper temperature threshold and a predetermined lower temperature threshold.

7. The apparatus of claim 1, wherein the reductant tank outlet coolant temperature target comprises a coolant temperature value sufficient to thaw reductant in the reductant tank during operation of the internal combustion engine, prevent refreezing of the reductant in the reductant tank during operation of the internal combustion engine, and maintain a temperature of reductant in the reductant tank and reductant delivery line below a maximum tolerable temperature during operation of the internal combustion engine.

8. The apparatus of claim 1, further comprising a heat exchange power module configured to determine a heat exchange power factor, the heat exchange power module determining the heat exchange power factor according to a first mode when the reductant tank reductant temperature is above a freezing temperature of the reductant and according to a second mode when the reductant tank reductant temperature is below the freezing temperature of the reductant, wherein the coolant valve flow rate command is based on the determined heat exchange power factor.

9. The apparatus of claim 8, wherein in the first mode, the heat exchange power factor is determined by multiplying together a level of reductant in the reductant tank, a rate of change of the reductant tank reductant temperature, and a specific heat of the reductant in the reductant tank.

10. The apparatus of claim 8, wherein in the second mode, the heat exchange power factor comprises a predetermined constant.

11. The apparatus of claim 8, further comprising a coolant temperature difference module configured to determine a difference between the reductant tank outlet coolant temperature target and the reductant tank inlet coolant temperature, wherein the coolant valve flow rate command is based on the difference between the reductant tank outlet coolant temperature target and the reductant tank inlet coolant temperature.

12. The apparatus of claim 11, further comprising a comparison module configured to compare the heat exchange power factor and the difference between the reductant tank outlet coolant temperature target and the reductant tank inlet coolant temperature against a predetermined look-up table to determine a coolant valve modulation signal value, wherein the coolant valve flow rate command corresponds with the determined coolant valve modulation signal value.

13. A reductant heating system, comprising:
a coolant line comprising a first portion positionable in heat exchanging communication with reductant in a reductant tank and a second portion positionable in heat exchanging communication with reductant in a reductant line, the reductant line configured to receive reductant from the reductant tank, wherein the second portion receives coolant exiting the reductant tank from the first portion;
a flow regulation device coupled to the coolant line and configured to regulate the flow rate of coolant entering the first portion of the coolant line; and
a controller communicable in signal transmitting communication with the flow regulation device to vary the flow rate of coolant through the first portion of the coolant line to achieve a desired temperature of coolant exiting the reductant tank in the second portion of the coolant line based on a temperature of coolant entering the reductant tank via the first portion and a temperature of reductant in the reductant tank.

14. The reductant heating system of claim 13, further comprising a temperature sensor coupled to the coolant line and configured to sense the temperature of coolant entering the reductant tank via the first portion of the coolant line.

15. The reductant heating system of claim 14, wherein the controller is further configured to vary the flow rate of coolant entering the first portion of the coolant line based on a rate of change of the temperature of reductant in the reductant tank.

16. The reductant heating system of claim 15, wherein the controller is further configured to vary the flow rate of coolant entering the first portion of the coolant line based on a specific heat of the reductant in the reductant tank.

17. The reductant heating system of claim 16, wherein the controller is further configured to vary the flow rate of coolant entering the first portion of the coolant line based on a level of reductant in the reductant tank.

18. The reductant heating system of claim 17, wherein the controller is further configured to vary the flow rate of coolant entering the first portion of the coolant line based on a difference between the temperature of the coolant sensed by the temperature sensor and the desired temperature of coolant in the second portion of the coolant line.

19. The reductant heating system of claim 18, wherein the controller is further configured to vary the flow rate of coolant entering the first portion of the coolant line based on a shape of the reductant tank and a specific heat of the coolant.

20. The reductant heating system of claim 13, wherein the second portion of the coolant line winds about the reductant line.

21. A method for heating reductant in a reductant line coupled to a reductant tank, comprising:
sensing a temperature of coolant entering a coolant line positioned in heat transfer communication with reductant in the reductant line and reductant tank;
determining upper and lower temperature thresholds of reductant in the reductant line; and regulating a single flow regulating valve to adjust a flow rate of coolant through the coolant line based on the sensed temperature of coolant entering the coolant line, a desired temperature of coolant exiting the reductant tank, and a temperature of reductant in the reductant tank to maintain the temperature of reductant in the reductant line below the upper temperature threshold and above the lower temperature threshold.

22. The method of claim 21, wherein regulating the single flow regulating valve comprises adjusting the flow rate of coolant through the coolant line to maintain a temperature of reductant in the reductant tank above a threshold.

* * * * *